United States Patent
Kato et al.

(10) Patent No.: US 10,315,521 B2
(45) Date of Patent: Jun. 11, 2019

(54) VEHICLE POWER SUPPLY SYSTEM

(71) Applicant: Nissan Motor Co., Ltd., Yokohama-shi, Kanagawa (JP)

(72) Inventors: Kouji Kato, Kanagawa (JP); Shigeyuki Kiyota, Kanagawa (JP); Yoshiyuki Tanaka, Kanagawa (JP); Toyoki Iguchi, Kanagawa (JP); Hiroaki Saitou, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 10 days.

(21) Appl. No.: 14/896,962

(22) PCT Filed: Jun. 13, 2014

(86) PCT No.: PCT/JP2014/065695
§ 371 (c)(1),
(2) Date: Dec. 9, 2015

(87) PCT Pub. No.: WO2015/001941
PCT Pub. Date: Jan. 8, 2015

(65) Prior Publication Data
US 2016/0176294 A1 Jun. 23, 2016

(30) Foreign Application Priority Data
Jul. 5, 2013 (JP) .................................. 2013-141458

(51) Int. Cl.
*B60L 3/04* (2006.01)
*B60L 3/00* (2019.01)
(Continued)

(52) U.S. Cl.
CPC .............. *B60L 3/04* (2013.01); *B60L 3/0007* (2013.01); *B60L 3/0038* (2013.01); *B60L 50/51* (2019.02);
(Continued)

(58) Field of Classification Search
CPC .... B60L 11/1864; B60L 2200/14; B60L 3/04; B60L 3/0007; B60L 3/0038;
(Continued)

(56) References Cited

U.S. PATENT DOCUMENTS 4,859,818 A 8/1989 Landais
5,238,083 A * 8/1993 Horie .................... B60L 3/0007
180/274

(Continued)

FOREIGN PATENT DOCUMENTS

CN 102328571 A 1/2012
JP 2006-136095 A 5/2006
(Continued)

*Primary Examiner* — Rexford N Barnie
*Assistant Examiner* — Terrence R Willoughby
(74) *Attorney, Agent, or Firm* — Global IP Counselors, LLP

(57) ABSTRACT

A vehicle power supply system is provided for an electric vehicle. The vehicle power supply system has a first relay and a second relay, which are two-contact movable relays that connect/disconnect a high voltage circuit. The first relay has a first movable contact that is arranged to move with respect to a first fixed contact in a first direction when connecting/disconnecting. The second relay has a second movable contact is arranged to move with respect to a second fixed contact in a second direction when connecting/disconnecting. The second direction is opposite to the first direction. One of the first and second relays is oriented such that its movable contact separates from its fixed contact in a direction in which the greatest acceleration input is applied at the time of a collision.

8 Claims, 4 Drawing Sheets

(51) Int. Cl.
 *B60L 50/51* (2019.01)
 *B60L 58/21* (2019.01)
 *B60R 21/00* (2006.01)
 *H01H 45/04* (2006.01)

(52) U.S. Cl.
 CPC ........... *B60L 58/21* (2019.02); *B60L 2220/14* (2013.01); *B60R 2021/0004* (2013.01); *B60R 2021/0006* (2013.01); *B60R 2021/0011* (2013.01); *H01H 45/04* (2013.01); *Y02T 10/7005* (2013.01); *Y02T 10/7061* (2013.01)

(58) Field of Classification Search
 CPC . Y02T 10/7061; Y02T 10/7005; H01H 45/04; H01M 2/34; H02J 7/0031; B60R 2021/0004; B60R 2021/0006; B60R 2021/0011
 See application file for complete search history.

(56) References Cited

U.S. PATENT DOCUMENTS

| | | | |
|---|---|---|---|
| 5,389,824 A * | 2/1995 | Moroto | B60K 28/14 307/10.1 |
| 6,169,947 B1 * | 1/2001 | Fukui | B60R 21/013 180/271 |
| 6,333,568 B1 | 12/2001 | Bitsche et al. | |
| 7,011,176 B2 * | 3/2006 | Yugo | B60L 3/0015 180/274 |
| 8,186,471 B2 * | 5/2012 | Ohno | B60L 3/0007 180/274 |
| 2006/0076833 A1 * | 4/2006 | Kojima | B60L 3/0007 307/10.1 |
| 2007/0026711 A1 * | 2/2007 | Chorian | B60K 28/14 439/174 |
| 2007/0152432 A1 | 7/2007 | Uchida | |
| 2011/0139595 A1 * | 6/2011 | Ishigaki | B60L 3/0007 200/52 R |
| 2011/0224869 A1 * | 9/2011 | Inagaki | B60L 3/04 701/33.4 |
| 2011/0315464 A1 | 12/2011 | Yokoyama et al. | |
| 2012/0068532 A1 * | 3/2012 | Tanabe | B60L 3/04 307/10.1 |
| 2012/0070706 A1 | 3/2012 | Miyazaki et al. | |
| 2014/0015311 A1 * | 1/2014 | Spjuth | B60R 16/02 307/9.1 |

FOREIGN PATENT DOCUMENTS

| | | |
|---|---|---|
| JP | 2007-118797 A | 5/2007 |
| JP | 2010-238632 A | 10/2010 |
| KR | 100303037 * | 7/2001 |

* cited by examiner

VEHICLE POWER SUPPLY SYSTEM

CROSS-REFERENCE TO RELATED APPLICATIONS

This application is a U.S. National stage application of International Application No. PCT/JP2014/065695, filed Jun. 13, 2014, which claims priority to Japanese Patent Application No. 2013-141458 filed in Japan on Jul. 5, 2013.

BACKGROUND

Field of the Invention

The present invention relates to a vehicle power supply system in which are arranged a first relay and a second relay, which are two contact movable relays that connect/disconnect a high voltage circuit.

Background Information

Conventionally, a vehicle power supply system is known, which carries out a control operation to disconnect the two system main relays at the time of a vehicle collision, when the collision is sensed by a collision sensor (for example, Patent Document 1: Japanese Laid-Open Patent Application No. 2006-136095).

SUMMARY

However, in a conventional vehicle power supply system, the direction in which the movable contacts of the two system main relays move is the same as the vehicle width direction, and the conduction movement direction and the interruption movement direction of the movable contacts are also arranged to be matched in the same directions. Consequently, there is a problem in that, even if the electromagnetic force of the two system main relays is turned OFF and the high voltage circuit is interrupted by a collision control, when a large acceleration input, which overcomes the spring force, is applied at the time of the collision, the two movable contacts are moved in the same direction so that electricity passes therethrough.

In view of the problems described above, an object of the present invention is to provide a vehicle power supply system capable of preventing electricity from passing through two relays simultaneously at the time of a collision.

In order to achieve the object above, a first relay and a second relay, which are two contact movable relays that connect/disconnect a high voltage circuit, are arranged according to the present invention. When arranging the first relay and the second relay in this vehicle power supply system, the directions in which a first movable contact and a second movable contact move when connecting/disconnecting are arranged so as to be mutually opposite directions, and one relay from among the first relay and the second relay is oriented such that the movable contact separates from fixed contacts in a direction in which a greatest acceleration input is applied at a time of a vehicle collision.

Thus, the movable contact of one relay from among the first relay and the second relay is arranged in a direction away from the fixed contacts, and the movable contact of the other relay is arranged in a direction that comes in contact with the fixed contacts, with respect to a direction in which a greatest acceleration input is applied at a time of a vehicle collision. That is, in the case where a direction in which a greatest acceleration input is applied at a time of a collision is, for example, the vehicle longitudinal acceleration, if both relays are disconnected at the time of a front collision, the movable contact of one relay stays separated from the fixed contacts due to the acceleration input from the front side of the vehicle, ensuring the disconnection of the high voltage circuit. In addition, if both relays are disconnected at the time of a rear collision, the movable contact of the other relay stays separated from the fixed contacts due to the acceleration input from the rear side of the vehicle, ensuring the disconnection of the high voltage circuit. In this manner, by orienting one relay such that the movable contact separates, in a direction in which a greatest acceleration input is applied at a time of a vehicle collision, electricity is prevented from passing through two relays simultaneously at the time of the vehicle collision.

BRIEF DESCRIPTION OF THE DRAWINGS

Referring now to the attached drawings which form a part of this original disclosure.

DETAILED DESCRIPTION OF THE EMBODIMENTS

Figure 1:
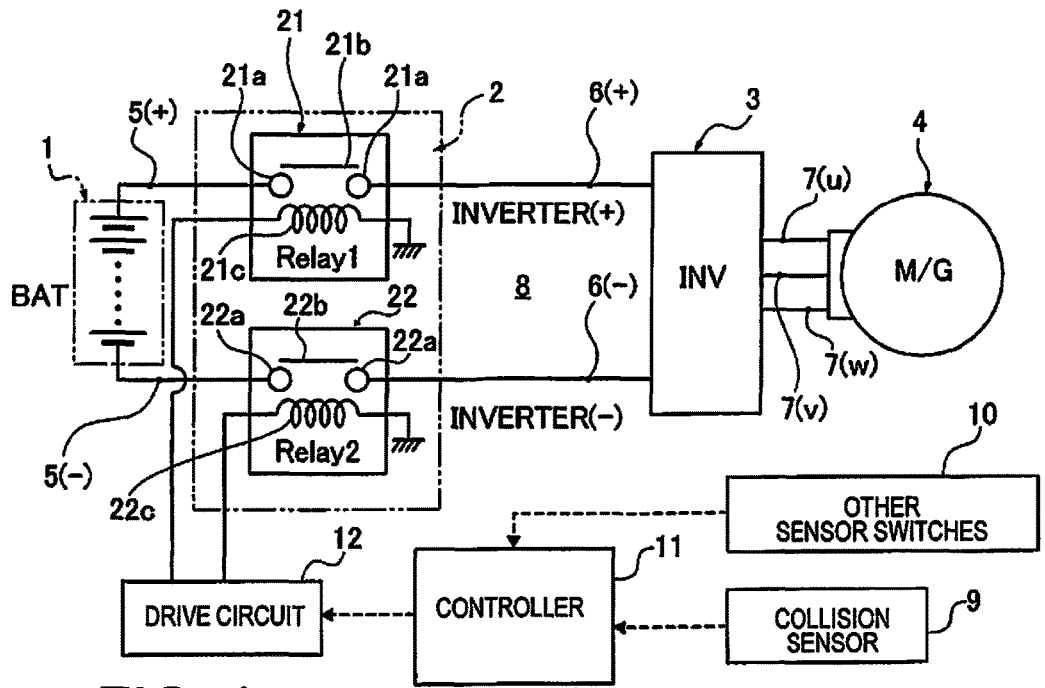
FIG. 1 is an overall system view illustrating a travel motor power supply system for an electric vehicle (one example of a vehicle power supply system) of the first embodiment.

Preferred embodiments for implementing the vehicle power supply system of the present invention is explained below based on the first embodiment illustrated in the drawings.

First Embodiment

The configuration is described first. The overall system configuration and the arrangement configuration of the two relays and the relay configuration will be separately described regarding the configuration of the travel motor power supply system for an electric vehicle (one example of a vehicle power supply system) according to the first embodiment.

Overall System Configuration

FIG. 1 illustrates the travel motor power supply system for an electric vehicle of the first embodiment. The overall system configuration will be described below, based on FIG. 1.

The travel motor power supply system for an electric vehicle is applied as a power source system of a travel motor mounted on a hybrid vehicle or an electric vehicle such as an electric automobile. This system comprises a high voltage battery 1, a junction box 2, an inverter 3, and a motor/generator 4, as illustrated in FIG. 1. A high voltage circuit 8 is configured by connecting these components 1, 2, 3, 4 via harnesses 5, 6, 7.

The high voltage battery 1 is a secondary battery which is mounted as a power source for the motor/generator 4, and, for example, a lithium ion battery is used in which a cell module obtained by laminating a large number of cells is set inside a battery pack case.

The junction box 2 is interposed between the high voltage battery 1 and the inverter 3, and aggregates a relay circuit for performing supply/interruption/distribution of heavy current. A first relay 21 and a second relay 22, which are contact movable relays that connect/disconnect the high voltage circuit 8, are provided to this junction box 2. The + sides of the first relay 21 and the high voltage battery 1 are connected by the battery harness 5 (+). The – sides of the second relay 22 and the high voltage battery 1 are connected by the battery harness 5 (–).

The inverter 3 is interposed between the junction box 2 and the motor/generator 4, and converts the direct current from the DC harnesses 6(+), 6(–) to a three-phase alternating current of the AC harnesses 7(u), 7(v), 7(w), during powering for driving the motor/generator 4 by the discharge of the high voltage battery 1. In addition, the inverter converts the three-phase alternating current from the AC harnesses 7(u), 7(v), 7(w) to a direct current to the DC harnesses 6(+), 6(–) during regeneration for charging the high voltage battery 1 with the power generation by the motor/generator 4.

The motor/generator 4 is a three-phase alternating current permanent magnet type synchronous motor; during powering, a three-phase alternating current is applied to the stator coil via the AC harnesses 7(u), 7(v), 7(w), and during regeneration, the three-phase alternating current generated by the stator coil is sent to the inverter 3 via the AC harnesses 7(u), 7(v), 7(w).

One each for a total of two relays 21, 22 are disposed relative to the high voltage circuit 8, such as disposing the first relay 21 on the positive side and disposing the second relay 22 on the negative side. By doing so, circuit breaking becomes possible even when one of the two relays 21, 22 becomes fixed, by configuring a circuit that is energized only when both of the two relays 21, 22 are turned ON.

A collision sensor 9, other sensor switches 10, a controller 11, and a drive circuit 12 are provided as a control system of the first relay 21 and the second relay 22.

The first relay 21 and the second relay 22 comprises a first fixed contact 21a, a first movable contact 21b, and a first coil 21c, and a second fixed contact 22a, a second movable contact 22b, and a second coil 22c, respectively. Details of the relay configuration will be described below.

A longitudinal G sensor or the like is used as the collision sensor 9, which detects the generation of a front collision or a rear collision when the sensor value exceeds a collision threshold. The other sensor switches 10 detect necessary information on the connection/disconnection of the first relay 21 and the second relay 22.

The controller 11 performs a collision response control for outputting a command to disconnect the first relay 21 and the second relay 22, when it is determined to be immediately before a collision, with the sensor value from the collision sensor 9 exceeding the collision threshold. When a command to disconnect the first relay 21 and the second relay 22 is input from the controller 11, the drive circuit 12 interrupts the drive current which has been conveyed to the coils 21c, 22c.

Arrangement Configuration of the Two Relays and the Relay Configuration

Figure 2:
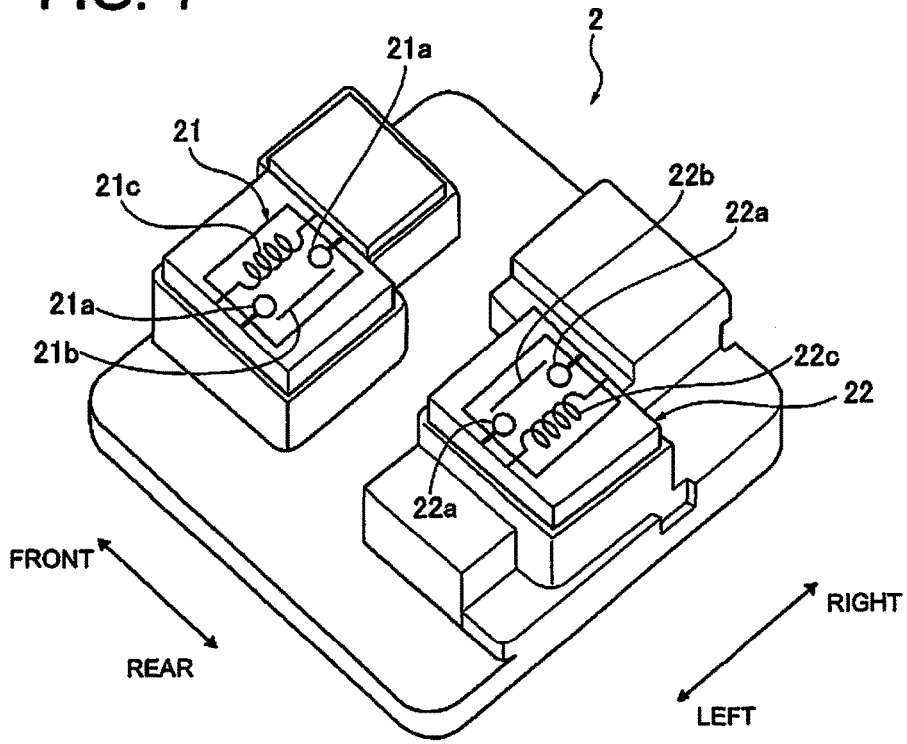
FIG. 2 is a perspective view illustrating one example of a junction box for use in a high voltage circuit of the travel motor power supply system for an electric vehicle of the first embodiment.

FIG. 2 illustrates one example of the junction box 2 used in the high voltage circuit 8. The arrangement configuration of the two relays, the first relay 21 and the second relay 22, will be described below, based on FIG. 2.

When arranging the first relay 21 and the second relay 22, the first relay 21 and the second relay 22 are arranged so as to be separated in the vehicle longitudinal direction, as well as being arranged so that parts thereof are shifted and overlapped in the vehicle width direction. Further, the arrangement is one in which both arrangement conditions (a), (b) below are satisfied.

(a) The directions in which the first movable contact 21b and the second movable contact 22b move when connecting/disconnecting are arranged so as to be mutually opposite directions. That is, the movement directions of the first movable contact 21b of the first relay 21 are: the direction of movement following interruption→conduction is forward of the vehicle, and the direction of movement following conduction→interruption is rearward of the vehicle, as illustrated in FIG. 2. In contrast, the movement directions of the second movable contact 22b of the second relay 22 are: the direction of movement following interruption→conduction is rearward of the vehicle, and the direction of movement following conduction→interruption is forward of the vehicle, as illustrated in FIG. 2.

(b) One relay from among the first relay 21 and the second relay 22 is oriented such that the movable contact separates from fixed contacts in the vehicle longitudinal direction selected in the first embodiment, as a direction in which a greatest acceleration input is applied at a time of a collision. That is, at the time of a front collision, when impact force is input toward the rear side of the vehicle, the second movable contact 22b of the second relay 22 is oriented to contact the second fixed contact 22a, whereas the first movable contact 21b of the first relay 21 is oriented so as to separate from the first fixed contact 21a, as illustrated in FIG. 2. At the time of a rear collision, when impact force is input toward the front side of the vehicle, the first movable contact 21b of the first relay 21 is oriented to contact the first fixed contact 21a, whereas the second movable contact 22b of the second relay 22 is oriented so as to separate from the second fixed contact 22a, as illustrated in FIG. 2.

Figure 3:
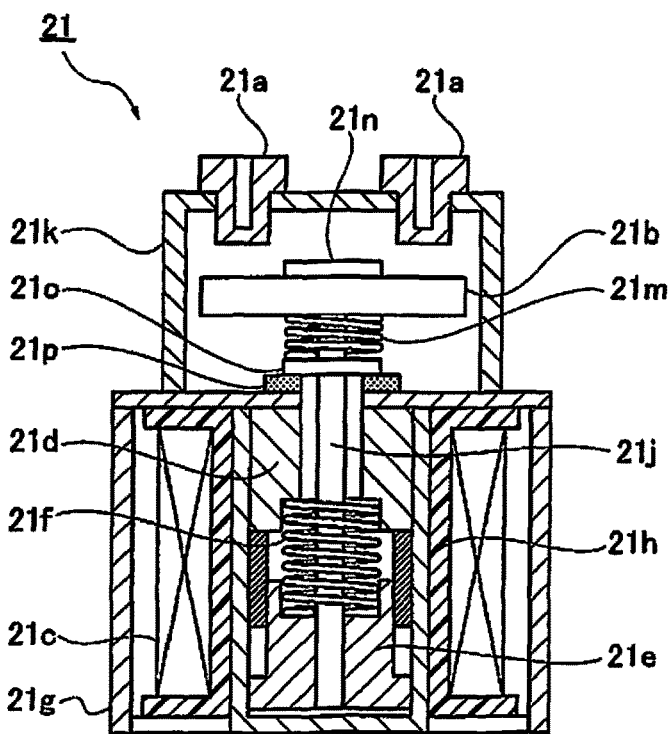
FIG. 3 is a cross-sectional view of the cutoff state illustrating one example of a configuration of the contact movable relays used in the junction box of the first embodiment.
Figure 4:
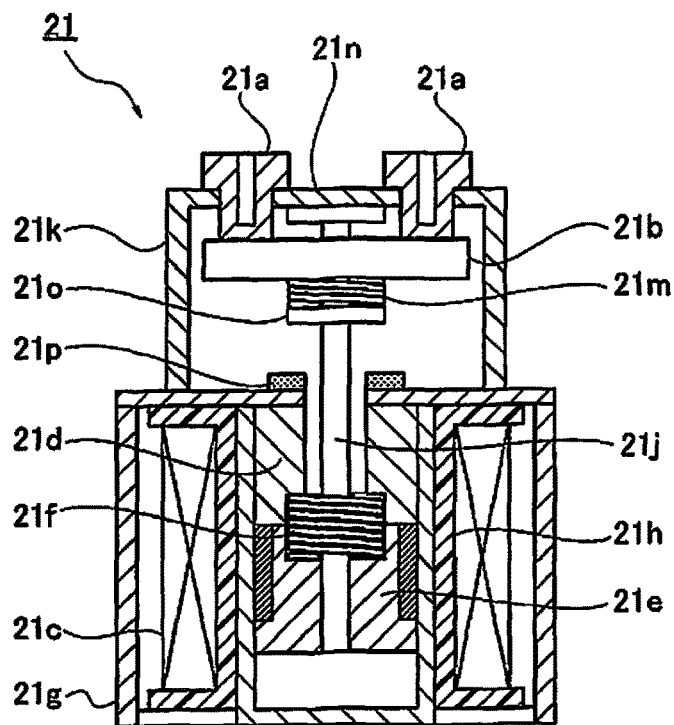
FIG. 4 is a cross-sectional view of the connected state illustrating one example of a configuration of the contact movable relays used in the junction box of the first embodiment.

The detailed configuration of the first relay 21 will be described based on FIG. 3 and FIG. 4. The first relay 21 comprises a first fixed contact 21a, a first movable contact 21b, a first coil 21c, a first fixed iron core 21d, a first movable iron core 21e, and a first return spring 21f, as illustrated in FIG. 3 and FIG. 4.

The first coil 21c is wound around a bobbin 21h installed in a yoke 21g, and an iron core case 21i is disposed so as to be fitted to the inner diameter side of the bobbin 21h. The iron core case 21i is formed in a bottom cylindrical shape, and the first fixed iron core 21d is disposed in the upper end thereof.

The first movable iron core 21e is magnetized along with the first fixed iron core 21d by the excitation of the first coil 21c, and is slidably disposed in the vertical direction below the first fixed iron core 21d inside the iron core case 21i, facing the first fixed iron core 21d so as to be capable of contacting/separating in the axial direction. A counter-bored portion is formed in the central portion of each opposing surface of this first fixed iron core 21d and the first movable iron core 21e, and the first return spring 21f is elastically fixed between these counter-bored portions.

A rod 21j is integrally erected in the center portion of the first movable iron core 21e. This rod 21j extends through the center portion of the first fixed iron core 21d and the upper end plate of the yoke 21g, so as to protrude into a shield case 21k, which is fixed to the upper end plate.

The first fixed contact 21a is disposed so as to extend through the upper wall of the shield case 21k in the vertical direction. On the other hand, the first movable contact 21b is positioned facing the first fixed contact 21a inside the shield case 21k, disposed relative to the upper end of the rod 21j and elastically supported by a contact pressure spring 21m. Specifically, the first movable contact 21b is elastically clamped so as to be movable in the vertical direction by the contact pressure spring 21m and a stopper 21n at the upper terminus of the rod 21j, and the contact pressure spring 21m is elastically provided between the first movable contact 21b and a spring seat 21o (elastically supported by a rubber damper 21p) provided to the rod 21j.

Here, in a first relay 21 configured in the way described above, if the first coil 21c is energized and magnetic force is generated in the first coil 21c, the first fixed iron core 21d and the first movable iron core 21e are magnetized, and the two iron cores 21d, 21e are drawn to each other. The first movable contact 21b is thereby integrally moved with the first movable iron core 21e in the axial direction so as to come in contact with the first fixed contact 21a, and the high voltage circuit 8 is connected such that the disconnected state of FIG. 3 transitions to the connected state of FIG. 4.

On the other hand, when the energization of the first coil 21c is stopped and the first coil 21c is demagnetized, the magnetization of the first fixed iron core 21d and the first movable iron core 21e is immediately eliminated, and the two iron cores 21d, 21e will be separated from each other due to the spring force of the first return spring 21f. The first movable contact 21b is thereby integrally moved with the first movable iron core 21e in the axial direction so as to separate from the first fixed contact 21a, and the high voltage circuit 8 is disconnected such that the connected state of FIG. 4 transitions to the disconnected state of FIG. 3. Since the configuration of the second relay 22 is the same as the first relay 21, any illustration and description thereof are omitted.

Next, the operations will be described. The high voltage circuit interruption effect at the time of a collision in the travel motor power supply system for an electric vehicle of the first embodiment will be described, based on FIG. 5 and FIG. 6.

Figure 5:
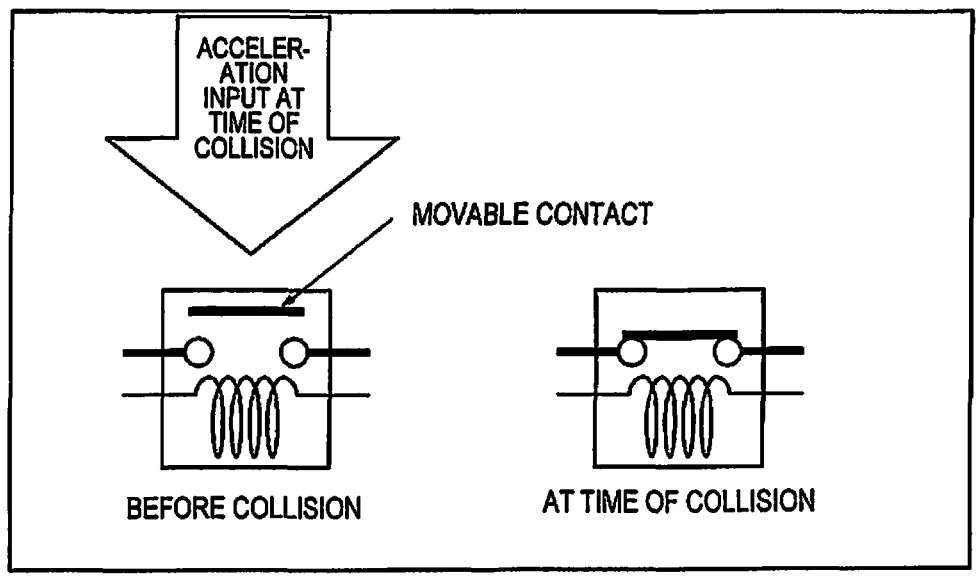
FIG. 5 is an explanatory view illustrating the problem of the relay arrangement of a Comparative Example.

For example, as illustrated in FIG. 5, a case in which the acceleration input direction matches the direction in which the movable contact of the relay comes in contact with the fixed contact shall be the comparative example. In the case of this comparative example, the high voltage circuit is assumed to be disconnected due to the electromagnetic force of the relay being turned OFF before the collision by the collision response control. However, if a large acceleration input, which overcomes the spring force, is applied at the time of the collision, the movable contact is moved in the direction toward the fixed contact and comes into contact, thereby enabling electricity to pass through the high voltage circuit. In this manner, if electricity passes through the high voltage circuit at the time of a collision, a harness disconnection or the like will be generated by the impact force, in a state in which high voltage is passing through.

In contrast, in the first embodiment, when arranging the first relay 21 and the second relay 22, the directions in which the first movable contact 21b and the second movable contact 22b move when connecting/disconnecting are arranged so as to be mutually opposite directions. Then, a configuration was employed in which one relay from among the first relay 21 and the second relay 22 is oriented such that the movable contact separates from the fixed contacts in the vehicle longitudinal direction in which the greatest acceleration input is applied at the time of a collision.

Thus, the movable contact of one relay from among the first relay 21 and the second relay 22 is arranged in a direction which separates from the fixed contacts, and the movable contact of the other relay is arranged in a direction which comes in contact with the fixed contacts, with respect to a direction in which a greatest acceleration input is applied at a time of a collision.

Figure 6:
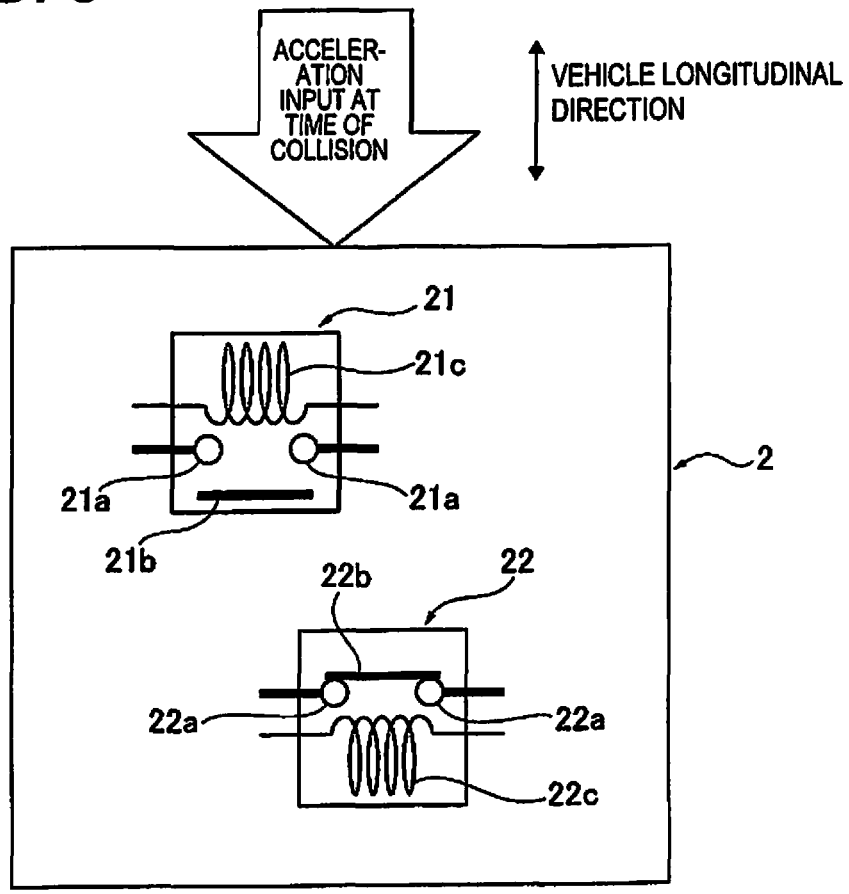
FIG. 6 is an explanatory view illustrating the relay action in the travel motor power supply system for an electric vehicle of the first embodiment.

That is, if both relays 21, 22 are disconnected at the time of a front collision by the collision response control, the first movable contact 21b of the first relay 21 will be kept separated from the first fixed contact 21a by the acceleration input from the front side of the vehicle, as illustrated in FIG. 6. At this time, the second movable contact 22b of the second relay 22 will be moved toward the second fixed contact 22a by the acceleration input and placed in a connected state. Therefore, at the time of a front collision, where there is acceleration input from the front side of the vehicle, the disconnection of the high voltage circuit 8 is ensured by the disconnection of the first relay 21, from among the two relays 21, 22, being maintained, regardless of the acceleration input from the front side of the vehicle.

In addition, if both relays 21, 22 are disconnected at the time of a rear collision by the collision response control, the second movable contact 22b of the second relay 22 will be kept separated from the second fixed contact 22a by the acceleration input from the rear side of the vehicle, which is the opposite direction of FIG. 6. At this time, the first movable contact 21b of the first relay 21 will be moved toward the first fixed contact 21a by the acceleration input and put in a connected state. Therefore, at the time of a rear collision where there is acceleration input from the rear side of the vehicle, the disconnection of the high voltage circuit 8 is ensured by the disconnection of the second relay 22, from among the two relays 21, 22, being maintained, regardless of the acceleration input from the rear side of the vehicle.

In this manner, by orienting one relay, from among the two relays 21, 22, such that the movable contact separates, in the vehicle longitudinal direction in which the greatest acceleration input is applied at the time of a collision, electricity is prevented from passing through the two relays 21, 22 simultaneously at the time of the collision, allowing a reliable disconnection of the high voltage circuit 8. As a result, the high voltage circuit 8 can be disconnected at the time of a front collision or at the time of a rear collision, and an effective collision response control in which the high voltage circuit 8 is disconnected immediately before a collision can be achieved.

Next, the effects will be described. The effects listed below can be obtained by implementing the travel motor power supply system for an electric vehicle of the first embodiment.

(1) A vehicle power supply system (travel motor power supply system for an electric vehicle) in which are arranged a first relay 21 and a second relay 22, which are two contact movable relays that connect/disconnect a high voltage circuit 8, wherein when arranging the first relay 21 and the second relay 22, the directions in which a first movable contact 21b and a second movable contact 22b move when connecting/disconnecting are arranged so as to be mutually opposite directions, and one relay from among the first relay 21 and the second relay 22 is oriented such that the movable contact separates from the fixed contacts in a direction in which a greatest acceleration input is applied at a time of a collision (FIG. 6). Accordingly, electricity can be prevented from passing through two relays simultaneously at the time of a collision.

(2) If a direction in which a greatest acceleration input is applied at a time of a collision is the vehicle longitudinal acceleration, one relay from among the first relay 21 and the second relay 22 is oriented such that the movable contact separates from the fixed contacts in the vehicle longitudinal direction (FIG. 6). Accordingly, in addition to the effect of (1), the high voltage circuit 8 can be disconnected with respect to both types of collisions, at the time of a front collision and at the time of a rear collision.

(3) The high voltage circuit 8 is a travel motor power supply circuit configured by connecting a high voltage battery 1, a junction box 2, an inverter 3, and a motor/generator 4 via harnesses 5, 6, 7, the first relay 21 and the second relay 22 are provided to the junction box 2, and one of each is disposed on a positive side and a negative side of the high voltage battery 1 (FIG. 1). Accordingly, in addition to the effect of (1) or (2), the high voltage circuit 8 in the travel motor power supply circuit of the electric vehicle can be disconnected at the time of a collision.

(4) A collision response control means (controller 11) is connected to the first relay 21 and the second relay 22 for carrying out a relay interruption control operation when sensing a vehicle collision (FIG. 1). Accordingly, in addition to the effects of (1)-(3), an effective collision response control in which the high voltage circuit 8 is disconnected immediately before a collision can be achieved.

The vehicle power supply system of the present invention was described above based on the first embodiment, but specific configurations thereof are not limited to the first embodiment, and various modifications and additions to the design can be made without departing from the scope of the invention according to each claim in the Claims.

Figure 7:
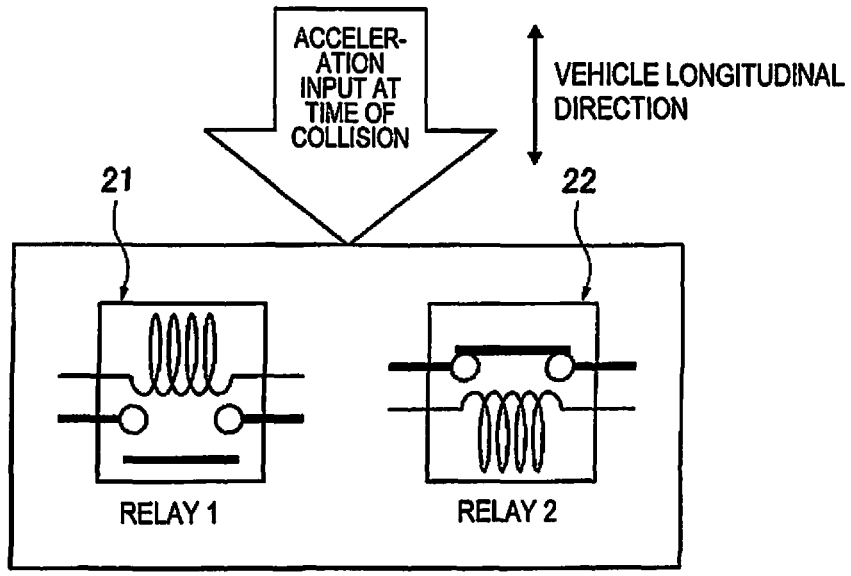
FIG. 7 is an explanatory view illustrating a first arrangement example in which the arrangement of the two relays is different from the first embodiment.
Figure 8:
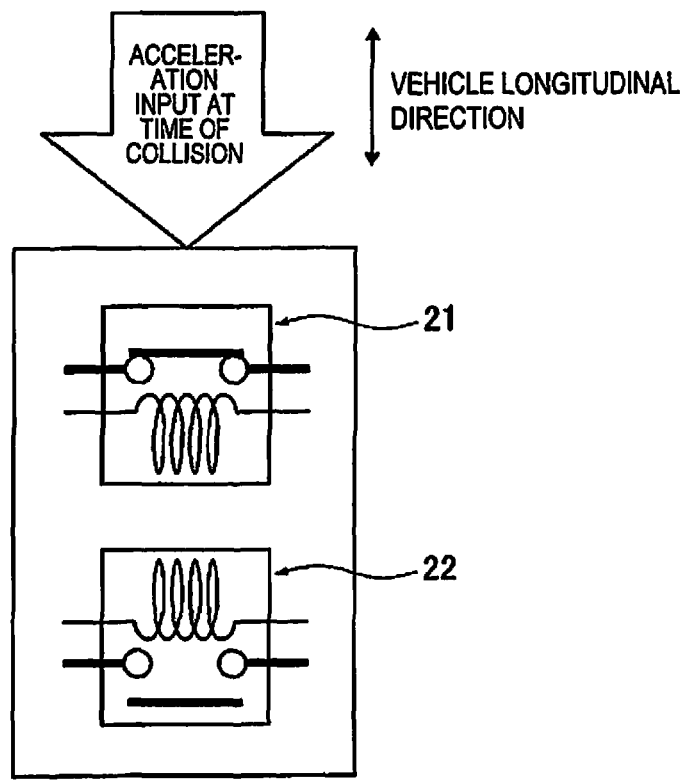
FIG. 8 is an explanatory view illustrating a second arrangement example in which the arrangement of the two relays is different from the first embodiment.

In the first embodiment, an example was shown in which the first relay 21 and the second relay 22 are arranged so as to be separated in the vehicle longitudinal direction, as well as being arranged so that parts thereof are shifted and overlapped in the vehicle width direction. However, the first relay 21 and the second relay 22 may be arranged so as to overlap in the vehicle longitudinal direction as well as being arranged side-by-side in the vehicle width direction, as illustrated in FIG. 7. In addition, the first relay 21 and the second relay 22 may be arranged side-by-side in the vehicle longitudinal direction as well as being arranged overlapping in the vehicle width direction, as illustrated in FIG. 8. In short, any arrangement in which, when arranging a first relay and a second relay, the directions in which a first movable contact and a second movable contact move when connecting/disconnecting are arranged so as to be mutually opposite directions, and one relay from among the first relay and the second relay is oriented such that the movable contact separates from the fixed contacts in a direction in which a greatest acceleration input is applied at a time of a collision, is included in the present invention.

In the first embodiment, an example was shown in which the first relay 21 and the second relay 22 are arranged, wherein a direction in which a greatest acceleration input is applied at a time of a collision is the vehicle longitudinal acceleration. However, a direction in which a greatest acceleration input is applied at a time of a collision may be configured so that a direction in which a greatest acceleration input is applied at a time of a collision is the vehicle width direction, so as to correspond to a collision from the side, or so that a direction in which a greatest acceleration input is applied at a time of a collision is set to an intermediate direction of the vehicle longitudinal acceleration and the vehicle width direction, so as to correspond to a collision from the front, a collision from the rear, a collision from the side, and an offset collision, or the like.

In the first embodiment, an example was shown in which a controller 11 for carrying out a relay interruption control operation when sensing a vehicle collision was connected to the first relay 21 and the second relay 22. However, a collision response control means is not required to be connected to the first relay 21 and the second relay 22. That is, even when the first relay 21 and the second relay 22 are both in a connected state at the time of a collision, the high voltage circuit can be disconnected by separating the movable contact of one relay from the fixed contact by means of the acceleration input by the collision.

In the first embodiment, an example was shown in which the vehicle power supply system of the present invention is applied to a travel motor power supply system for an electric vehicle. However, the vehicle power supply system of the present invention may be applied to any vehicle other than a travel motor power supply system for an electric vehicle, which is mounted on a hybrid vehicle, an electric vehicle, and the like, and equipped with a high voltage circuit in which are arranged a first relay and a second relay, which are two contact movable relays that connect/disconnect.

The invention claimed is:

1. A vehicle power supply system comprising:
   a high voltage circuit;
   a first relay including a first fixed contact and a first movable contact that is movably arranged with respect to the first fixed contact to connect/disconnect the high voltage circuit; and
   a second relay including a second fixed contact and a second movable contact that is movably arranged with respect to the second fixed contact to connect/disconnect the high voltage circuit,
   the first movable contact of the first relay and the second movable contact of the second relay being arranged to move in mutually opposite directions along a same axis when connecting and being arranged to move in mutually opposite directions along the same axis when disconnecting, and one of the first relay and the second relay being oriented so that a corresponding one of the first and second movable contacts separates from a corresponding one of the first and second fixed contacts in a direction in which a greatest acceleration input is applied at a time of a vehicle collision and so that electricity is prevented from passing through the first relay and the second relay simultaneously at the time of the vehicle collision.

2. The vehicle power supply system according to claim 1, wherein
   the direction in which the greatest acceleration input is applied at the time of a vehicle collision is a vehicle longitudinal acceleration, the one of the first relay and the second relay is oriented so that the corresponding one of the first and second movable contacts separates from the corresponding one of the first and second fixed contacts in the vehicle longitudinal direction.

3. The vehicle power supply system according to claim 1, wherein the high voltage circuit is a travel motor power supply circuit that interconnects a high voltage battery, a junction box, an inverter and a motor/generator via harnesses; and the first relay and the second relay are provided to the junction box, and one of the first and second relays is disposed on a positive side of the high voltage battery and the other of the first and second relays is disposed on a negative side of the high voltage battery.

4. The vehicle power supply system according to claim 1, further comprising a collision response controller is connected to the first relay and the second relay and programmed to carry out a relay interruption control operation upon sensing a vehicle collision.

5. The vehicle power supply system according to claim 2, wherein the high voltage circuit is a travel motor power supply circuit that interconnects a high voltage battery, a junction box, an inverter and a motor/generator via harnesses; and the first relay and the second relay are provided to the junction box, and one of the first and second relays is disposed on a positive side of the high voltage battery and the other of the first and second relays is disposed on a negative side of the high voltage battery.

6. The vehicle power supply system according to claim 5, further comprising a collision response controller connected to the first relay and the second relay and programmed to carry out a relay interruption control operation upon sensing a vehicle collision.

7. The vehicle power supply system according to claim 2, further comprising a collision response controller connected to the first relay and the second relay and programmed to carry out a relay interruption control operation upon sensing a vehicle collision.

8. The vehicle power supply system according to claim 3, further comprising a collision response controller connected to the first relay and the second relay and programmed to carry out a relay interruption control operation upon sensing a vehicle collision.

* * * * *